United States Patent
Lee et al.

(10) Patent No.: US 10,295,146 B2
(45) Date of Patent: May 21, 2019

(54) DISPLAY DEVICE AND METHOD OF MANUFACTURING THE SAME

(71) Applicant: Samsung Display Co., Ltd., Yongin-si, Gyeonggi-do (KR)

(72) Inventors: Kang-woo Lee, Seoul (KR); Dawoon Kim, Seoul (KR); Yu-dong Kim, Suwon-si (KR); Hyun-hwa Song, Hwaseong-si (KR); Myeong-ju Shin, Seoul (KR); Seunghwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 627 days.

(21) Appl. No.: 14/957,070

(22) Filed: Dec. 2, 2015

(65) Prior Publication Data
US 2016/0230951 A1    Aug. 11, 2016

(30) Foreign Application Priority Data

Feb. 9, 2015    (KR) .................. 10-2015-0019698

(51) Int. Cl.
| | |
|---|---|
| F21V 5/00 | (2018.01) |
| F21V 7/05 | (2006.01) |
| G02B 5/02 | (2006.01) |
| F21Y 105/00 | (2016.01) |
| G02F 1/1335 | (2006.01) |

(52) U.S. Cl.
CPC .............. *F21V 5/002* (2013.01); *F21V 7/05* (2013.01); *G02B 5/0278* (2013.01); *G02F 1/133603* (2013.01); *G02F 1/133606* (2013.01); *G02F 1/133611* (2013.01); *F21Y 2105/00* (2013.01)

(58) Field of Classification Search
CPC ................ F21V 5/00; F21V 7/05; G02B 5/02
USPC ....................................................... 362/97.1
See application file for complete search history.

(56) References Cited

U.S. PATENT DOCUMENTS

| | | |
|---|---|---|
| 6,332,690 B1 | 12/2001 | Murofushi |
| 6,818,139 B1 | 11/2004 | Lee et al. |
| 8,454,184 B2 | 6/2013 | Choi et al. |

(Continued)

FOREIGN PATENT DOCUMENTS

| | | |
|---|---|---|
| JP | 2004354468 A | 12/2004 |
| JP | 2013247019 A | 9/2013 |

(Continued)

OTHER PUBLICATIONS

European Search Report issued by European Patent Office dated May 25, 2016 in connection with European Patent Application No. 16152236.2, which also claims Korean Patent Application Serial No. 10-2015-0019698 as its priority document.

*Primary Examiner* — Alexander K Garlen
*Assistant Examiner* — Colin J Cattanach
(74) *Attorney, Agent, or Firm* — H.C. Park & Associates, PLC

(57) ABSTRACT

A display device includes a display panel and a backlight unit. The display panel receives a light to display an image and has a first radius of curvature. The backlight unit is disposed under the display panel to provide the light to the display panel and has a second radius of curvature. The backlight unit includes a plurality of light sources and a plurality of scattering units. The light sources emit the light and the scattering units scatter at least a portion of the light.

20 Claims, 10 Drawing Sheets

(56) References Cited

U.S. PATENT DOCUMENTS

| | | | |
|---|---|---|---|
| 8,979,294 B2 | 3/2015 | An et al. | |
| 9,841,634 B2 * | 12/2017 | Park | G02F 1/133308 |
| 2004/0130912 A1 | 7/2004 | Miyashita | |
| 2004/0252485 A1 * | 12/2004 | Leu | G02F 1/133606 |
| | | | 362/84 |
| 2010/0164860 A1 | 7/2010 | Misono | |
| 2010/0289983 A1 * | 11/2010 | Rocard | B29D 11/0074 |
| | | | 349/62 |
| 2013/0235585 A1 | 9/2013 | Kim et al. | |
| 2013/0258671 A1 * | 10/2013 | Baumann | F21V 29/02 |
| | | | 362/293 |
| 2013/0321740 A1 | 12/2013 | An et al. | |
| 2014/0009914 A1 * | 1/2014 | Cho | G09F 9/35 |
| | | | 362/97.3 |
| 2014/0340614 A1 * | 11/2014 | Kamiyoshihara | G02F 1/1336 |
| | | | 349/61 |
| 2015/0219324 A1 * | 8/2015 | Kim | G02F 1/133305 |
| | | | 349/58 |

FOREIGN PATENT DOCUMENTS

| | | |
|---|---|---|
| KR | 1020000067791 A | 11/2000 |
| KR | 1020050089286 A | 9/2005 |
| KR | 1020110094974 A | 8/2011 |
| KR | 20120082860 A | 7/2012 |
| KR | 1020130102714 A | 9/2013 |
| KR | 1013195430000 B1 | 10/2013 |
| KR | 1020140036461 A | 3/2014 |

\* cited by examiner

DISPLAY DEVICE AND METHOD OF MANUFACTURING THE SAME

CLAIM OF PRIORITY

This U.S. non-provisional patent application claims the priority of and all the benefits accruing under 35 U.S.C. § 119 of Korean Patent Application No. 10-2015-0019698, filed on Feb. 9, 2015, the contents of which are hereby incorporated by reference in its entirety.

BACKGROUND OF THE INVENTION

1. Field of the Invention

The present disclosure relates to a display device and a method of manufacturing the same. More particularly, the present disclosure relates to a display device capable of preventing a display quality from being deteriorated and a method of manufacturing the display device.

2. Description of the Related Art

A flat panel display device is applied to various kinds of information processing devices, such as a television set, a monitor, a notebook computer, a mobile phone, etc., to display an image. In recent years, a curved surface display device with a curved shape has been developed. The curved surface display device provides a user with a display area having a curved display surface to increase three-dimensional effect, sense of immersion (or immersiveness), and presence of the image.

SUMMARY OF THE INVENTION

The present disclosure provides a display device capable of preventing a display quality from being deteriorated.

The present disclosure provides a method of manufacturing the display device to prevent the display quality from being deteriorated.

A flat panel display device is applied to various kinds of information processing devices, such as a television set, a monitor, a notebook computer, a mobile phone, etc., to display an image. In recent years, a curved surface display device with a curved shape has been developed. The curved surface display device provides a user with a display area having a curved display surface to increase three-dimensional effect, sense of immersion (or immersiveness), and presence of the image.

Embodiments of the inventive concept provide a display device including a display panel and a backlight unit. The display panel receives a light to display an image and has a first radius of curvature. The backlight unit is disposed under the display panel to provide the light to the display panel and has a second radius of curvature. The backlight unit includes a plurality of light sources and a plurality of scattering units. The light sources emit the light and the scattering units scatter at least a portion of the light.

The light sources are arranged in a matrix form along a first direction and a second direction substantially perpendicular to the first direction when viewed in a thickness direction of the display panel. The scattering units are disposed between the light sources.

When viewed in the thickness direction of the display panel, the light sources include a first light source, a second light source spaced apart from the first light source in the first direction, a third light source spaced apart from the first light source in the second direction, and a fourth light source spaced apart from the third light source in the first direction. At least one scattering unit of the scattering units is disposed between the first, second, third, and fourth light sources.

The light sources are arranged in a matrix form along a first direction and a third direction when viewed in a thickness direction of the display panel, the third direction crosses each of the first direction and a second direction substantially perpendicular to the first direction. The scattering units are disposed between the light sources.

When viewed in a thickness direction of the display panel, the light sources include a first light source, a second light source spaced apart from the first light source in the first direction, a third light source spaced apart from the first light source in the third direction, and a fourth light source spaced apart from the third light source in the first direction. At least one scattering unit of the scattering units is disposed between the first, second, third, and fourth light sources.

When viewed in a thickness direction of the display panel, the light sources are disposed to correspond to vertices of a parallelogram and the scattering units are disposed inside the parallelogram.

The scattering units are overlapped with a cross point of diagonal lines of the parallelogram.

Each of the scattering units has a thickness greater than a thickness of each of the light sources.

The number of the scattering units is smaller than a number of the light sources.

Each of the scattering units includes at least one of at least one metal selected from the group consisting of gold, silver, aluminum, platinum, palladium, cobalt, ruthenium, copper, indium, nickel, and iron, an alloy of at least one metal selected from the group consisting of gold, silver, aluminum, platinum, palladium, cobalt, ruthenium, copper, indium, nickel, and iron, $TiO_2$, $SiO_2$, $BaSO_4$, and $CaCO_3$.

Each of the scattering units includes at least one of polycarbonate (PC), polyethyleneterephthalate (PET), polyethylene (PE), polypropylene (PP), polysulfone (PSF), polymethylmethacrylate (PMMA), triacetylcellulose (TAC), cycloolefin (COP), and cycloolefin copolymer (COC).

A distance of arc between the light sources arranged in a first direction is in a range from about 80 mm to about 120 mm.

The backlight unit further includes a reflection sheet disposed under the light sources and the scattering units to reflect at least a portion of the light and a diffusion plate disposed on the light sources and the scattering units to diffuse the light. A vertical distance (H1) between the diffusion plate and the reflection sheet and a distance (D1) of arc between the light sources arranged in a first direction satisfy the following relational formula of $$6.5 \leq H1/D1 \leq 9.0.$$

A distance (D1) of arc between the light sources arranged in a first direction and a first radius of curvature (R1) satisfy the following relational formula of $$1/50 \leq D1/R1 \leq 3/50.$$

Embodiments of the inventive concept provide a manufacturing method of a display device including preparing a display panel having a first radius of curvature and providing a backlight unit having a second radius of curvature under the display panel. The providing of the backlight unit includes providing of a plurality of light sources and a plurality of scattering units.

The providing of the light sources and the scattering units includes providing the light sources in a matrix form along a first direction and a second direction substantially perpendicular to the first direction when viewed in a thickness direction of the display panel and providing the scattering units between the light sources.

The providing of the light sources and the scattering units includes providing the light sources in a matrix form along a first direction and a third direction when viewed in a thickness direction of the display panel and providing the scattering units between the light sources. The third direction crosses each of the first direction and a second direction substantially perpendicular to the first direction.

The providing of the backlight unit further includes providing a reflection sheet under the light sources and the scattering units and providing a diffusion plate on the light sources and the scattering units. A vertical distance (H1) between the diffusion plate and the reflection sheet and a distance (D1) of arc between the light sources arranged in a first direction satisfy the following relational formula of $$6.5 \leq H1/D1 \leq 9.0.$$

When the backlight unit is provided, a distance (D1) of arc between the light sources arranged in a first direction and a first radius of curvature (R1) satisfy the following relational formula of $$1/50 \leq D1/R1 \leq 3/50.$$

According to the above, the display quality of the display device may be prevented from being deteriorated.

In addition, the display device manufactured by the manufacturing method may prevent the display quality from being deteriorated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
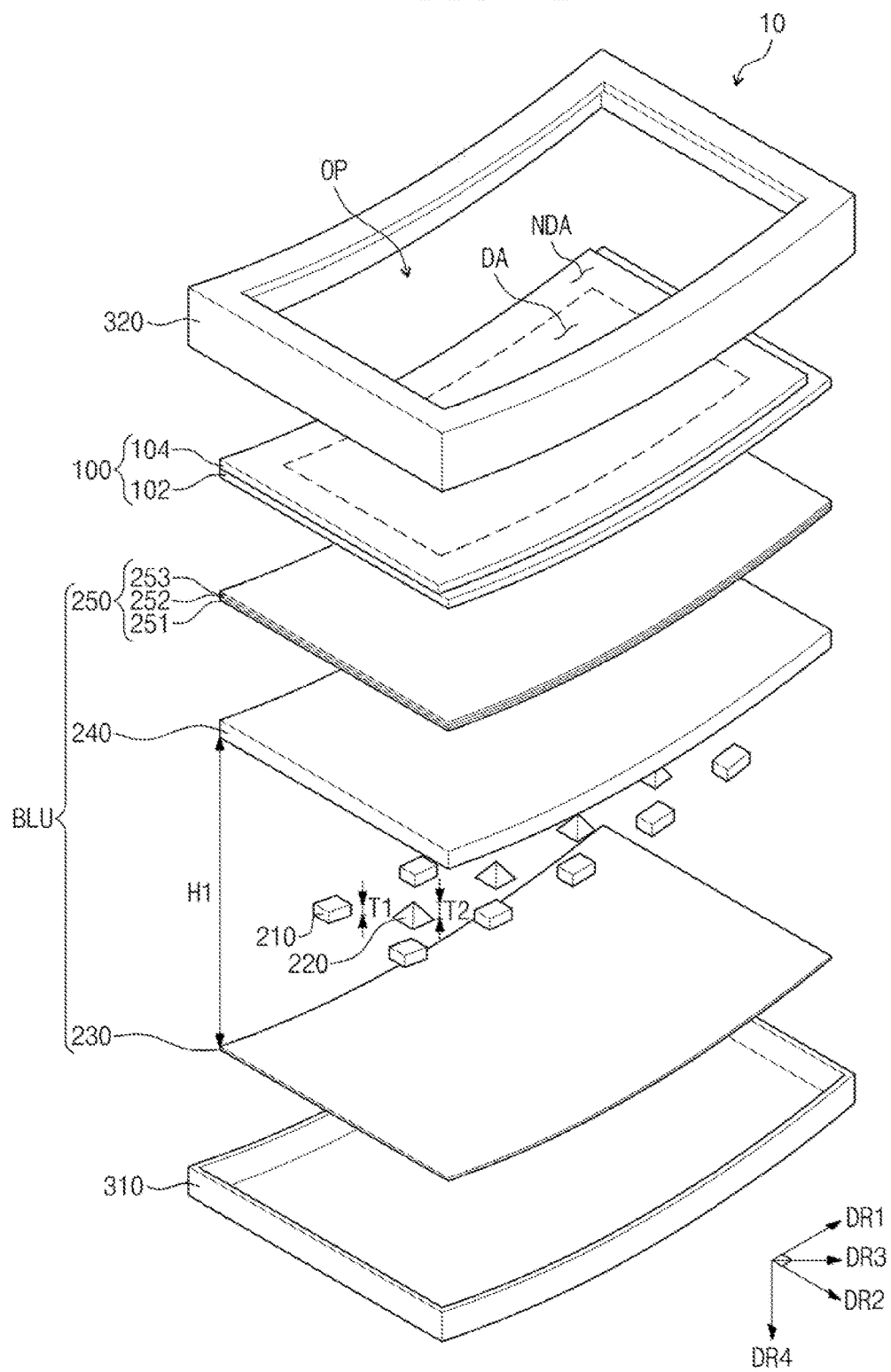
FIG. 1 is an exploded perspective view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially related terms, such as "beneath", "below", "lower", "above", "upper" and the like, may be used herein for ease of description to describe one element or feature's relationship to another element(s) or feature(s) as illustrated in the figures. It will be understood that the spatially related terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially related descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the an to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A flat panel display device is applied to various kinds of information processing devices, such as a television set, a monitor, a notebook computer, a mobile phone, etc., to display an image. In recent years, a curved surface display device with a curved shape has been developed. The curved surface display device provides a user with a display area having a curved display surface to increase three-dimensional effect, sense of immersion (or immersiveness), and presence of the image.

Hereinafter, the present invention will be explained in detail with reference to the accompanying drawings.

Figure 2A:
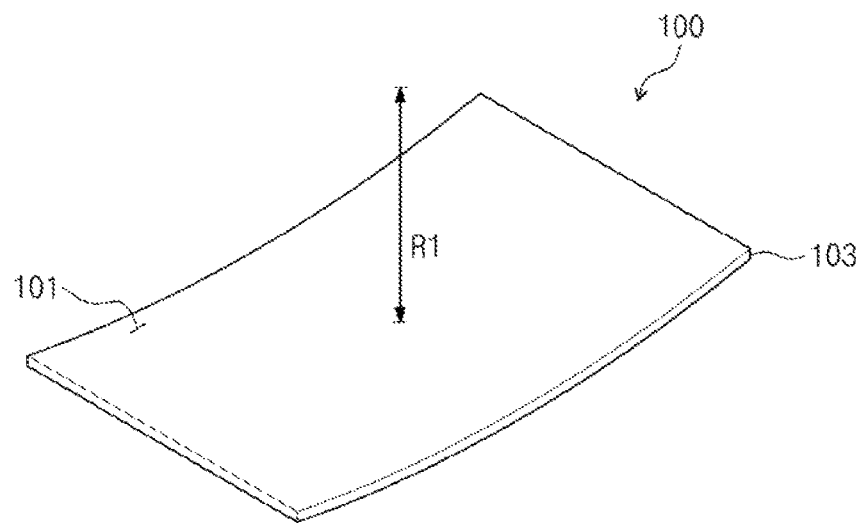
FIG. 2A is a perspective view showing a display panel of a display device according to an exemplary embodiment of the present disclosure.
Figure 2B:
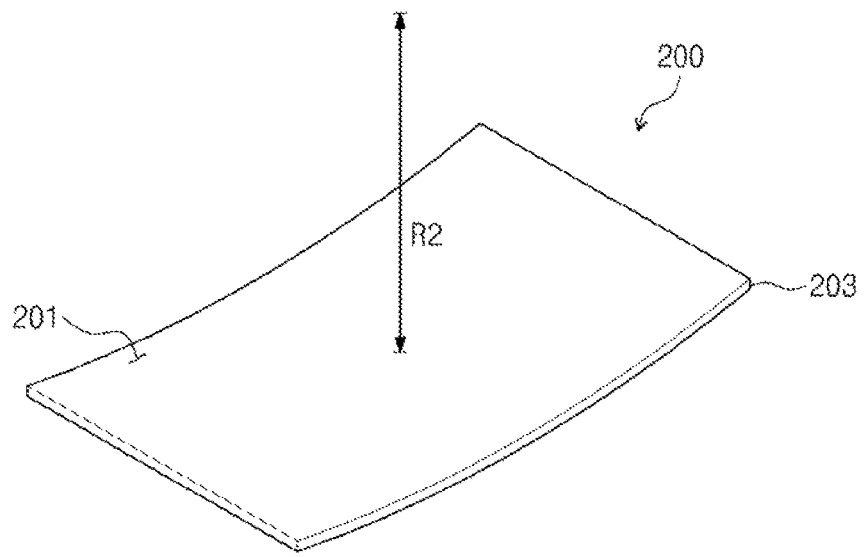
FIG. 2B is a perspective view showing a backlight unit of a display device according to an exemplary embodiment of the present disclosure.

FIG. 1 is an exploded perspective view showing a display device 10 according to an exemplary embodiment of the present disclosure, FIG. 2A is a perspective view showing a display panel 100 of the display device 10 according to an exemplary embodiment of the present disclosure, and FIG. 2B is a perspective view showing a backlight unit BLU of the display device 10 according to an exemplary embodiment of the present disclosure.

Referring to FIGS. 1, 2A, and 2B, the display device 10 includes a display panel 100 and a backlight unit BLU.

The display panel 100 displays an image. The display panel 100 includes a display surface 101 to display the image and a rear surface 103 facing the display surface 101. Although not shown in figures, the display surface 101 includes a display area DA in which the image is displayed and a non-display area NDA in which the image is not displayed.

The display area DA displays the image. When viewed in a thickness direction DR4 of the display device 10, the display area DA has substantially a rectangular shape, but the shape of the display area DA should not be limited to the rectangular shape.

The display area DA includes a plurality of pixel areas (not shown) arranged in a matrix form. The pixel areas include a plurality of pixels (not shown), respectively.

The non-display area NDA does not display the image. When viewed in the thickness direction DR4 of the display device 10, the non-display area NDA surrounds the display area DA. The non-display area NDA is disposed adjacent to the display area DA in a first direction DR1 and a second direction DR2 substantially vertical to the first direction DR1.

As the display panel 100, a non-self-emissive display panel that requires a separate light source, e.g., the backlight unit BLU, may be used rather than a self-emissive display panel such as an organic light emitting display panel. For instance, various display panels, e.g., a liquid crystal display panel, an electrophoretic display panel, etc., may be used as the display panel 100. In the present exemplary embodiment, the liquid crystal display panel as the display panel 100.

The display panel 100 has a substantially rectangular plate shape when viewed in the thickness direction DR4 of the display device 10. The display panel 100 includes a first substrate 102, a second substrate 104 facing the first substrate 102, and a liquid crystal layer (not shown) disposed between the first and second substrates 102 and 104.

Although not shown in figures, the first substrate 102 includes a plurality of gate lines extending in the first direction DR1 and a plurality of data lines extending in a second direction DR2 substantially perpendicular to the first direction DR1 and insulated from the gate lines while crossing the gate lines. The first substrate 102 includes a plurality of pixel areas defined therein and arranged in a matrix form. Each pixel area includes a thin film transistor and a pixel electrode, which are disposed therein. The thin film transistor includes a gate electrode electrically connected to a corresponding gate line of the gate lines, a source electrode electrically connected to a corresponding data line of the data lines, and a drain electrode electrically connected to the pixel electrode. Accordingly, the thin film transistor applies a signal to the pixel electrode to control or drive the pixel areas.

Although not shown in figures, the second substrate 104 includes color filters, each of which realizes a predetermined color using a light, and a common electrode disposed on the color filters to face the pixel electrode. However, according to embodiments, the color filters and the common electrode may be disposed on the first substrate 102.

The liquid crystal layer (not shown) is disposed between the first and second substrates 102 and 104. The liquid crystal layer includes liquid crystal molecules aligned in a specific direction by voltages respectively applied to the pixel electrode and the common electrode and controls a transmittance of the light generated by the backlight unit BLU and passing through the liquid crystal layer, and thus the display panel 100 displays the image.

The display panel 100 may be curved to have a first radius of curvature R1. For instance, a display curved surface 101 of the display panel 100 has the first radius of curvature R1. However, when the display panel 100 is concave-curved (curved inwards) when viewed from the display curved surface 101 to the rear surface 103, the rear surface 103 may have the first radius of curvature R1.

The first radius of curvature R1 is in a range from about 2000 mm to about 5000 mm. When the first radius of curvature R1 is smaller than about 2000 mm, a user is difficult to perceive the image displayed through the display device 10, and when the first radius of curvature R1 exceeds about 5000 mm, three-dimensional effect, sense of immersion (or immersiveness), and presence of the image of the image displayed through the display device 10 are deteriorated.

In FIGS. 1 and 2A, the display panel 100 has a concave shape when viewed in the thickness direction DR4 of the display device 10, but the shape of the display panel 100 should not be limited to the concave shape. That is, the display panel 100 may have a convex shape when viewed in the thickness direction DR4 of the display device 10.

The display device 10 according to the present exemplary embodiment includes the backlight unit BLU. The backlight unit BLU provides the display panel 100 with the light. The backlight unit BLU may be curved to have a second radius of curvature R2. For instance, an upper surface 201 of the backlight unit BLU has the second radius of curvature R2. However, when the backlight unit BLU is concave-curved (curved inwards) when viewed from the upper surface 201 to a lower surface 203, the lower surface 203 may have the second radius of curvature R2. In more detail, the backlight unit BLU includes a diffusion plate 240 and an upper surface of the diffusion plate 240 has the second radius of curvature R2.

The backlight unit BLU includes a plurality of light sources 210 and a plurality of scattering units 220. The light sources 210 emit the light provided to the display panel 100. Each of the light sources 210 may be, but not limited to, a light emitting diode. The light sources 210 are disposed to respectively correspond to the pixel areas (not shown) in a one-to-one correspondence, but they should not be limited thereto or thereby. That is, two or more light sources 210 may be disposed to correspond to each of the pixel areas (not shown), or one light source 210 may be disposed to two or more pixel areas.

The scattering units 220 scatter the light emitted from the light source 210 and provide the scattered light to the display panel 100. The light source 210 and the scattering units 220 will be described in detail later.

The backlight unit BLU further includes a reflection sheet 230 and the diffusion plate 240. The reflection sheet 230 is disposed under the light sources 210 and the scattering units 220. The reflection sheet 230 reflects at least a portion of the light provided from the light sources 210.

The diffusion plate 240 is disposed above the light sources 210 and the scattering units 220. The diffusion plate 240 diffuses the light provided from the light sources 210. Although not shown in figures, the diffusion plate 240 may include a diffusion agent therein. The diffusion plate 240 may include a diffusion layer coated on a surface thereof.

The backlight unit BLU further includes an optical member 250 disposed between the display panel 100 and the light sources 210. The optical member 250 improves a brightness and a viewing angle of the light exiting through an exit surface thereof.

The optical member 250 includes a first optical sheet 251, a second optical sheet 252, and a third optical sheet 253, which are sequentially stacked. The stack order of the first, second, and third optical sheets 251, 252, and 253 included in the optical member 250 should not be limited to a specific order.

The first optical sheet 251 may be, but not limited to, a diffusion sheet to diffuse the light emitted from the light sources 210. The second optical sheet 252 may be, but not limited to, a prism sheet to condense the light diffused by the diffusion sheet in a direction substantially perpendicular to a surface of the display panel 100. The third optical sheet 253 may be, but not limited to, a protection sheet to protect the prism sheet from external impacts. At least one of the first, second, and third optical sheets 251, 252, and 253 may be provided in a plural number, and if necessary, one of the first, second, and third optical sheets 251, 252, and 253 may be omitted. Although not shown in figures, at least one surface of the optical member 250 may have a concavo-convex shape.

The backlight unit BLU includes a bottom chassis 310 and a top chassis 320. The bottom chassis 310 has an accommodating space therein and the light sources 210 and the scattering units 220 are accommodated in the accommodating space. The bottom chassis 310 includes a bottom surface and a sidewall extending from an edge of the bottom surface to a direction substantially perpendicular to the bottom surface. In FIG. 1, both outer and inner surfaces of the sidewall extend in a direction substantially vertical to the bottom surface, but they should not be limited thereto or thereby. That is, the inner surface of the sidewall may extend to be inclined with respect to the bottom surface.

The top chassis 320 is coupled to the bottom chassis 310 and faces the bottom chassis 310. The top chassis 320 covers an edge of the display panel 100. The top chassis 320 is provided with an opening OP formed therethrough to correspond to an area in which the image is displayed. The top chassis 320 may be omitted.

The display device 10 according to the present exemplary may further include a mold frame (not shown) disposed between the bottom chassis 310 and the top chassis 320 to support the display panel 100. The mold flame (not shown) prevents the backlight unit BLU from being separated from the bottom chassis 310 and supports the display panel 100. The top chassis 320 is coupled to the bottom chassis 310 to prevent the display panel 100 from being separated from the mold frame (not shown).

Figure 3A:
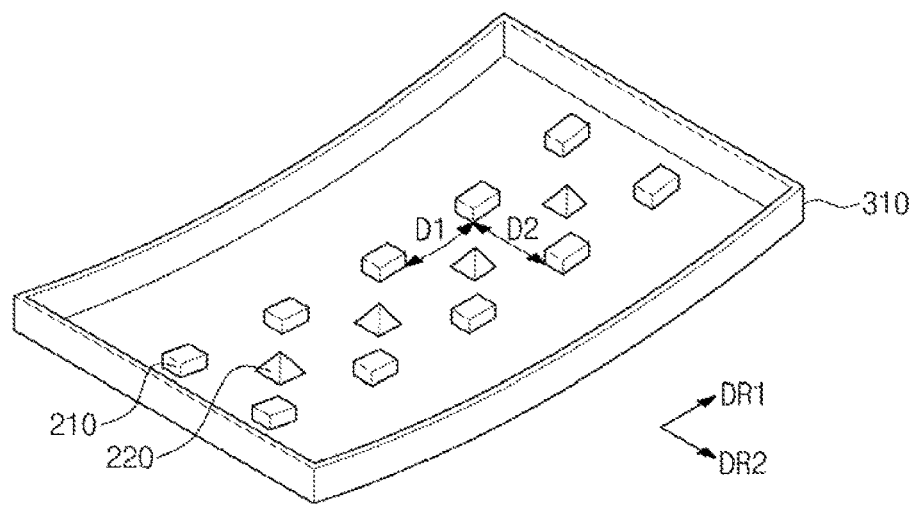
FIG. 3A is a perspective view showing light sources, scattering units, and a bottom chassis of a display device according to an exemplary embodiment of the present disclosure.
Figure 3B:
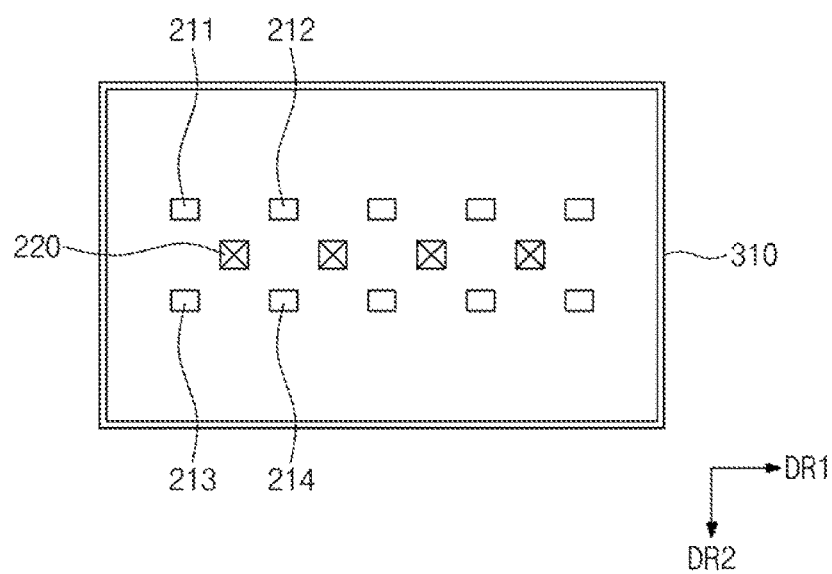
FIG. 3B is a plan view showing the light sources, the scattering units, and the bottom chassis shown in FIG. 3A.
Figure 3C:
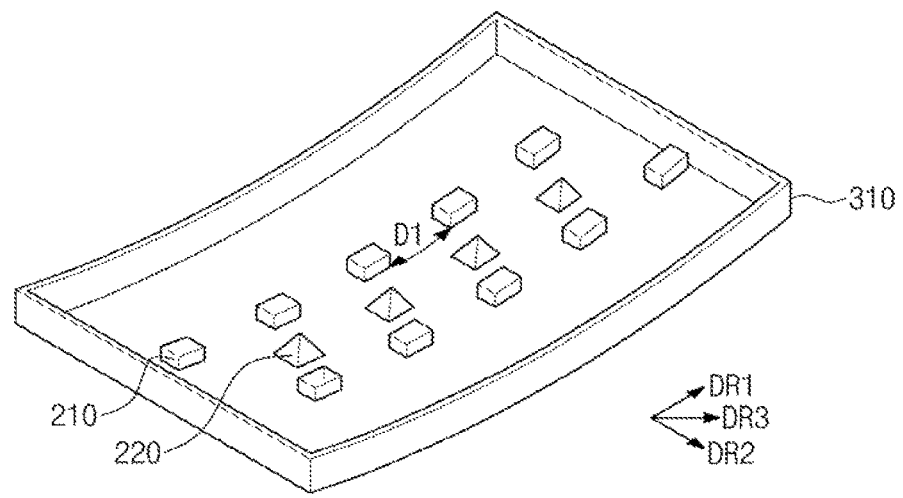
FIG. 3C is a perspective view showing light sources, scattering units, and a bottom chassis of a display device according to an exemplary embodiment of the present disclosure.
Figure 3D:
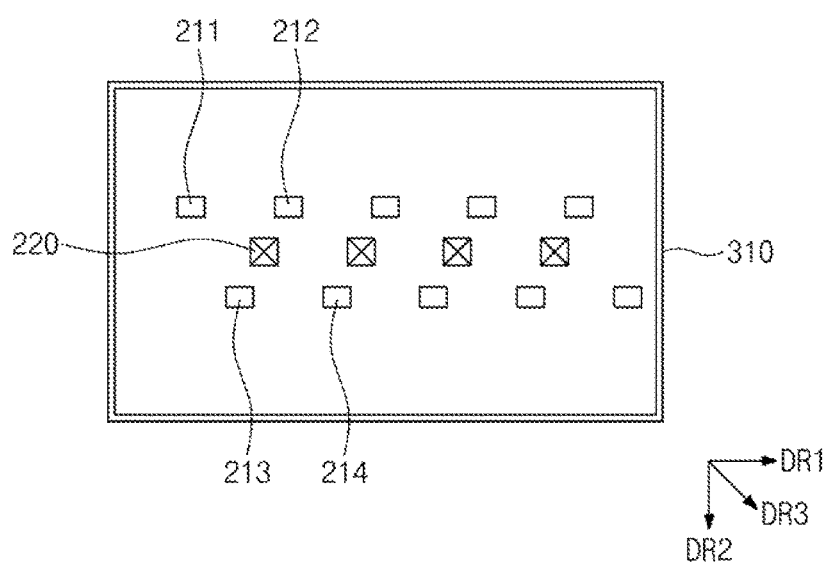
FIG. 3D is a plan view showing the light sources, the scattering units, and the bottom chassis shown in FIG. 3C.
Figure 4A:
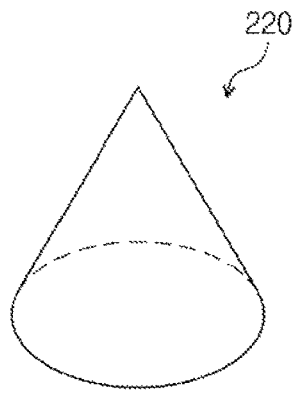
FIGS. 4A to 4N are perspective views showing scattering units of a display device according to an exemplary embodiment of the present disclosure.
Figure 4B:
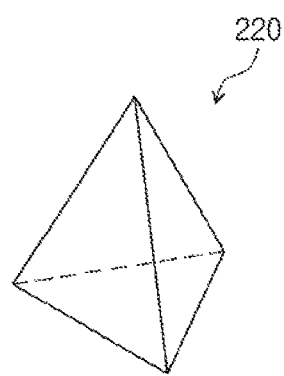
Figure 4C:
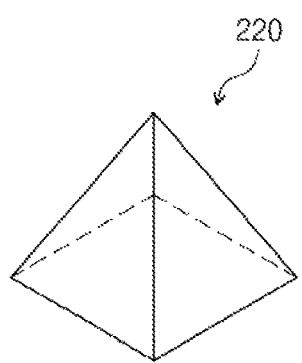
Figure 4D:
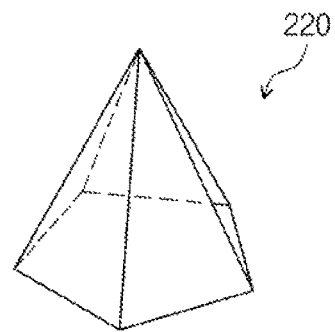
Figure 4E:
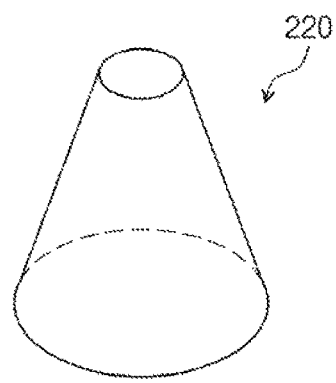
Figure 4F:
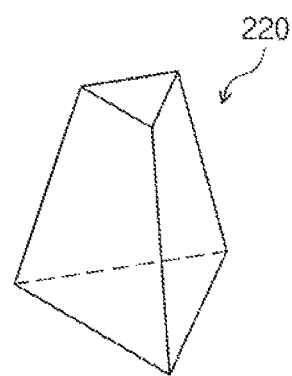
Figure 4G:
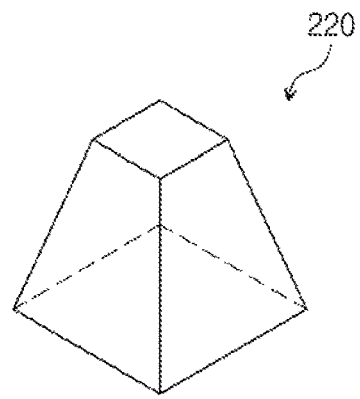
Figure 4H:
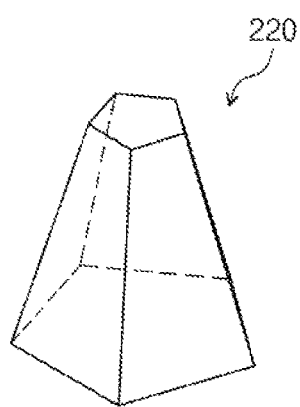
Figure 4I:
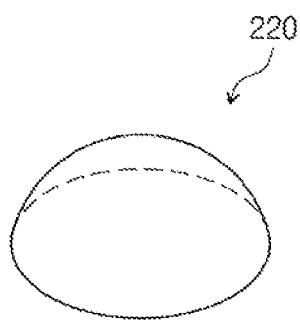
Figure 4J:
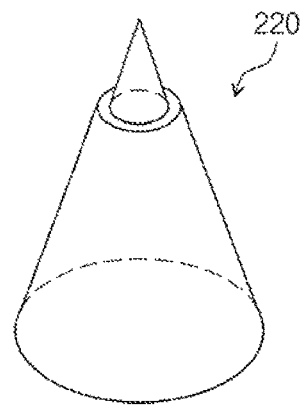
Figure 4K:
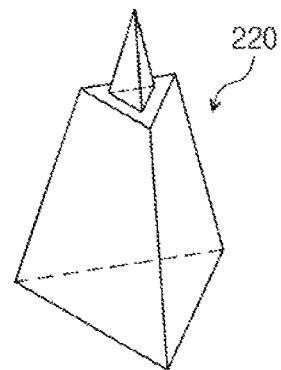
Figure 4L:
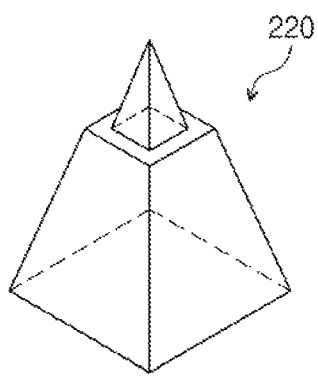
Figure 4M:
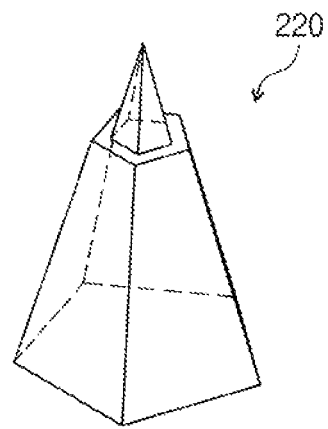
Figure 4N:
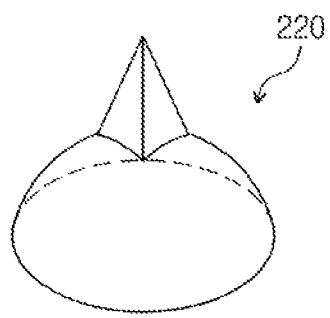

FIG. 3A is a perspective view showing light sources, scattering units, and a bottom chassis of a display device according to an exemplary embodiment of the present disclosure, FIG. 3B is a plan view showing the light sources, the scattering units, and the bottom chassis shown in FIG. 3A, FIG. 3C is a perspective view showing light sources, scattering units, and a bottom chassis of a display device according to an exemplary embodiment of the present disclosure, and FIG. 3D is a plan view showing the light sources, the scattering units, and the bottom chassis shown in FIG. 3C. FIGS. 4A to 4N are perspective views showing scattering units of a display device according to an exemplary embodiment of the present disclosure.

In FIGS. 3A to 3D, the light sources 210 are disposed on the bottom chassis 310, but they should not be limited thereto or thereby. That is, the light sources 210 may be disposed on the reflection sheet 230 (refer to FIG. 1). In addition, the light sources 210 may be disposed on a circuit board (not shown). The circuit board has substantially a plate shape and is provided in a single or plural number in accordance with rows or columns, in which the light sources 210 are arranged.

As described above, referring to FIGS. 1 and 3A to 3D, the backlight unit BLU includes the light sources 210 and the scattering units 220. The number of the scattering units 220 is smaller than the number of the light sources 210, but it should not be limited thereto or thereby. According to embodiments, the number of the scattering units 220 may be equal to or larger than the number of the light sources 210 (not shown).

In FIGS. 1 and 3A to 3D, each of the light sources 210 has a rectangular parallelepiped shape that is curved, but it should not be limited thereto or thereby. The light sources 210 may have various shapes as long as each of the light sources 210 provides the light to the display panel 100.

The light sources 210 have the same thickness T1 (FIG. 1), but they should not be limited thereto or thereby. That is, the thickness T1 of the light sources 210 may be changed. For instance, the thickness T1 of the light sources 210 becomes thicker as a distance from a center of gravity of the backlight unit BLU decreases, and becomes thinner as the distance from the center of gravity of the backlight unit BLU increases.

The light sources 210 are disposed on the bottom chassis 310 curved along the first direction DR1. A distance D1 of arc between the light sources 210 arranged in the first direction DR1 may be equal to a distance D2 between the light sources 210 arranged in the second direction DR2. However, according to embodiments, the distance D1 of arc between the light sources 210 arranged in the first direction DR1 may be equal to the distance D2 between the light sources 210 arranged in the second direction DR2.

In FIGS. 1 and 3A to 3D, the distance D1 of arc between the light sources 210 arranged in the first direction DR1 is constant, but the distance D1 of arc between the light sources 210 arranged in the first direction DR1 may not be constant according to embodiments. For instance, the distance D1 of arc between the light sources 210 arranged in the first direction DR1 may be shortened as the distance from the center of gravity of the display panel 100 decreases and the distance D1 of arc between the light sources 210 arranged in the first direction DR1 may be lengthened as the distance from the center of gravity of the display panel 100 increases.

In FIGS. 1, 3A, and 3B, the distance D2 between the light sources 210 arranged in the second direction DR2 is constant, but the distance D2 between the light sources 210 arranged in the second direction DR2 may not be constant according to embodiments. For instance, the distance D2 between the light sources 210 arranged in the second direction DR2 may be shortened as the distance from the center of gravity of the display panel 100 decreases and the distance D2 between the light sources 210 arranged in the second direction DR2 may be lengthened as the distance from the center of gravity of the display panel 100 increases.

In FIGS. 1, 3C, and 3D, a distance of arc between the light sources 210 arranged in the third direction DR3 is constant, but the distance of arc between the light sources 210 arranged in the third direction DR3 may not be constant according to embodiments. For instance, the distance of arc between the light sources 210 arranged in the third direction DR3 may be shortened as the distance from the center of gravity of the display panel 100 decreases and the distance of arc between the light sources 210 arranged in the third direction DR3 may be lengthened as the distance from the center of gravity of the display panel 100 increases.

A vertical distance H1 between the diffusion plate 240 and the reflection sheet 230 and the distance D1 of arc between the light sources 210 arranged in the first direction DR1 satisfy the following relational formula 1. In the exploded perspective view FIG. 1, for the convenience of explanation, the vertical distance H1 is expressed between the diffusion plate 240 and the reflection sheet 230, which are separated from each other, however the vertical distance D1 means a distance between the diffusion plate 240 and the reflection sheet 230 after the diffusion plate 240 is assembled to the reflection sheet 230.

The following relational formula 1 shows the distance D1 of arc between the light sources 210 arranged in the first direction DR1 as a representative example, but the distance D2 between the light sources 210 arranged in the second direction DR2 and the vertical distance between the diffusion plate 240 and the reflection sheet 230 may satisfy the following relational formula 1.

The distance D1 of arc between the light sources 210 arranged in the first direction DR1 means a shortest distance among distances of arc between the light sources 210 arranged in the first direction DR1.

As a representative example, the distance D1 of arc between the light sources 210 arranged in a first direction DR1 is in a range from about 80 mm to about 120 mm.

The distance D2 between the light sources 210 arranged in the second direction DR2 means a shortest distance among distances between the light sources 210 arranged in the second direction DR2. The distance D2 between the light sources 210 arranged in the second direction DR2 may be a distance of arc between the light sources 210 arranged in the second direction DR2 or a distance of segment between the light sources 210 arranged in the second direction DR2.

$$6.5 \leq H1/D1 \leq 9.0 \qquad \text{Relational formula 1}$$

When a value of H1/D1 is less than about 6.5, the distance D1 of arc between the light sources 210 arranged in the first direction DR1 is longer than the vertical distance between the diffusion plate 240 and the reflection sheet 230 and the number of the light sources respectively corresponding to the pixels (not shown) of the display panel 100 is reduced. As a result, a dark area of the display panel 100 increases. When the value of H1/D1 exceeds about 9.0, the distance D1 of arc between the light sources 210 arranged in the first direction DR1 is shorter than the vertical distance between the diffusion plate 240 and the reflection sheet 230, and thus a light efficiency of the display panel 100 is lowered compared to the number of the light sources 210.

The distance D1 of arc between the light sources 210 arranged in the first direction DR1 and the first radius of curvature R satisfy the following relational formula 2. The following relational formula 2 shows the distance D1 of arc between the light sources 210 arranged in the first direction DR1 as a representative example, but the distance D2 between the light sources 210 arranged in the second direction DR2 and the first radius of curvature R1 may satisfy the following relational formula 2.

$$1/50 \leq D1/R1 \leq 3/50 \qquad \text{Relational formula 2}$$

When a value of D1/R1 is less than about 1/50, the distance D1 of arc between the light sources 210 arranged in the first direction DR1 is shorter than the first radius of curvature R1, and thus a light efficiency of the display panel 100 is lowered compared to the number of the light sources 210. When the value of D1/R1 exceeds about 3/50, the distance D1 of arc between the light sources 210 arranged in the first direction DR1 is longer than the first radius of curvature R1 and the number of the light sources respectively corresponding to the pixels (not shown) of the display panel 100 is reduced. As a result, the dark area of the display panel 100 increases.

The scattering units 220 scatter the light to decrease the dark area. As shown in FIGS. 4A to 4N, the scattering units 220 may have various shapes. In FIGS. 4A to 4N, for the convenience of explanation, a lower surface of each of the scattering units 220 is flat, however the lower surface of each of the scattering units 220 is curved when the scattering units 220 are provided to the backlight unit BLU.

Each of the scattering units 210 includes at least one of at least one metal selected from the group consisting of gold, silver, aluminum, platinum, palladium, cobalt, ruthenium, copper, indium, nickel, and iron, an alloy of at least one metal selected from the group consisting of gold, silver, aluminum, platinum, palladium, cobalt, ruthenium, copper, indium, nickel, and iron, $TiO_2$, $SiO_2$, $BaSO_4$, and $CaCO_3$, but it should not be limited thereto or thereby.

The scattering units 220 may be transparent. Each of the scattering units 220 includes at least one of polycarbonate (PC), polyethyleneterephthalate (PET), polyethylene (PE), polypropylene (PP), polysulfone (PSF), polymethylmethacrylate (PMMA), triacetylcellulose (TAC), cycloolefin (COP), and cycloolefin copolymer (COC).

The scattering units 220 have the same thickness T2, but they should not be limited thereto or thereby. That is, the thickness T2 of the scattering units 220 may be changed. For instance, the thickness T2 of the scattering units 220 becomes thicker as a distance from a center of gravity of the backlight unit BLU decreases, and becomes thinner as the distance from the center of gravity of the backlight unit BLU increases.

The thickness T2 of each of the scattering units 220 is thicker than the thickness T1 of each of the light sources 210, however the thickness T2 of each of the scattering units 220 may substantially the same as the thickness T1 of each of the light sources 210 according to embodiments.

The scattering units 220 make contact with the diffusion plate 240. The scattering units 220 support the diffusion plate 240, but they should not be limited thereto or thereby. That is, the scattering units 220 may be spaced apart from the diffusion plate 240.

Referring to FIGS. 1 and 3A to 3D, when viewed in the thickness direction DR4 of the display panel 100, the light sources 210 are disposed to correspond to vertices of a parallelogram and the scattering units 220 are disposed in the parallelogram. At least one of the scattering units 220 is overlapped with a cross point of diagonal lines of the parallelogram.

Referring to FIGS. 1, 3A, and 3B, when viewed in the thickness direction DR4 of the display panel 100, the light sources 210 are arranged in a matrix form along the first direction DR1 and the second direction DR2 substantially perpendicular to the first direction DR1. The light sources 210 are disposed to correspond to vertices of a rectangular shape of vertices of a square shape. The scattering units 220 are disposed between the light sources 210. For instance, at least one of the scattering units 220 is overlapped with a cross point of diagonal lines of the rectangular shape or a cross point of diagonal lines of the square shape.

When viewed in the thickness direction DR4 of the display panel 100, the light sources 210 include a first light source 211, a second light source 212 spaced apart from the first light source 211 in the first direction DR1, a third light source 213 spaced apart from the first light source 211 in the second direction DR2, and a fourth light source 214 spaced apart from the third light source 213 in the first direction DR1. A distance between the first and second light sources 211 and 212 may substantially the same as a distance between the third and fourth light sources 213 and 214. A distance between the first and third light sources 211 and 213 may substantially the same as a distance between the second and fourth light sources 212 and 214. However, according to embodiments, the distance between the first and second light sources 211 and 212 may be different from the distance between the third and fourth light sources 213 and 214 and the distance between the first and third light sources 211 and 213 may be different from the distance between the second and fourth light sources 212 and 214.

At least one of the scattering units 220 may be disposed between the first, second, third, and fourth light sources 211, 212, 213, and 214. In FIGS. 3A and 3B, only one scattering unit is disposed between the first, second, third, and fourth light sources 211, 212, 213, and 214, but the number of the scattering unit disposed between the first, second, third, and fourth light sources 211, 212, 213, and 214 should not be limited to one. That is, plural scattering units 220 may be disposed between the first, second, third, and fourth light sources 211, 212, 213, and 214.

Referring to FIGS. 1, 3C, and 3D, when viewed in the thickness direction DR4 of the display panel 100, the light sources 210 are arranged in a matrix form along the first direction DR and the third direction DR3 crossing each of the first direction DR1 and the second direction DR2 substantially perpendicular to the first direction DR1. The light sources 210 are disposed to correspond to vertices of a parallelogram except for the rectangular shape and the square shape. The scattering units 220 are disposed between the light sources 210. For instance, at least one of the scattering units 220 is overlapped with a cross point of diagonal lines of the parallelogram except for the rectangular shape and the square shape.

When viewed in the thickness direction DR4 of the display panel 100, the light sources 210 include a first light source 211, a second light source 212 spaced apart from the first light source 211 in the first direction DR1, a third light source 213 spaced apart from the first light source 211 in the third direction DR3, and a fourth light source 214 spaced apart from the third light source 213 in the first direction DR1. A distance between the first and second light sources 211 and 212 may substantially the same as a distance between the third and fourth light sources 213 and 214. A distance between the first and third light sources 211 and 213 may substantially the same as a distance between the second and fourth light sources 212 and 214. However, according to embodiments, the distance between the first and second light sources 211 and 212 may be different from the distance between the third and fourth light sources 213 and 214 and the distance between the first and third light sources 211 and 213 may be different from the distance between the second and fourth light sources 212 and 214.

At least one of the scattering units 220 may be disposed between the first, second, third, and fourth light sources 211, 212, 213, and 214. In FIGS. 3A and 3B, only one scattering unit is disposed between the first, second, third, and fourth light sources 211, 212, 213, and 214, but the number of the scattering unit disposed between the first, second, third, and fourth light sources 211, 212, 213, and 214 should not be limited to one. That is, plural scattering units 220 may be disposed between the first, second, third, and fourth light sources 211, 212, 213, and 214.

As described above, the display device according to the present exemplary embodiment includes the scattering units disposed between the light sources, and thus an amount of the light provided to the display panel is maintained even though the number of the light sources is reduced. In addition, since the light sources are arranged in consideration of relational formulas 1 and 2, the dark area generated when the light sources and the scattering units are provided to the backlight unit having the second radius of curvature may be reduced. Therefore, the number of the light sources of the display device may be reduced and the display quality of the display device may be prevented from being deteriorated.

Hereinafter, a manufacturing method of the display device 10 will be described in detail.

Figure 5:
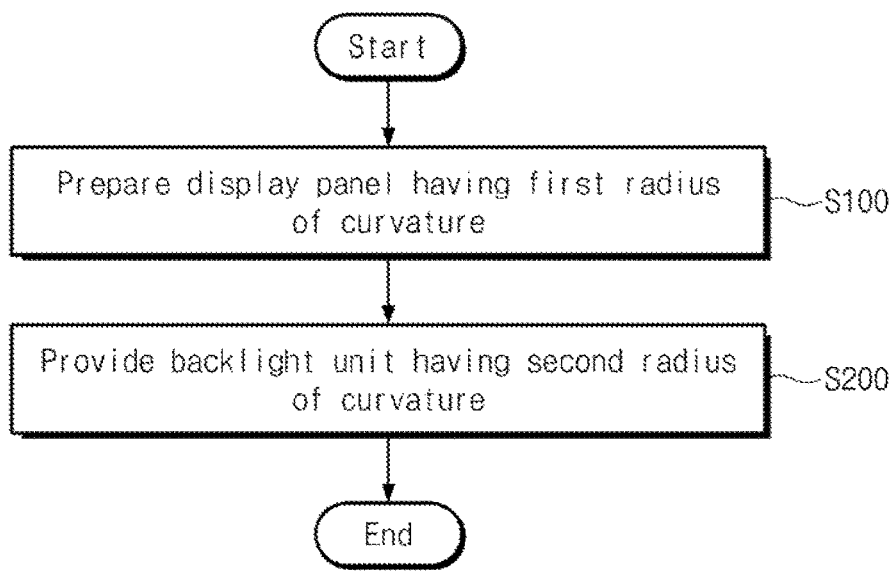
FIG. 5 is a flowchart showing a method of manufacturing a display device according to an exemplary embodiment of the present disclosure.

FIG. 5 is a flowchart showing a manufacturing method of the display device 10 according to an exemplary embodiment of the present disclosure.

Referring to FIGS. 1, 2A, 2B, 3A to 3D, and 5, the manufacturing method of the display device 10 includes preparing the display panel 100 having the first radius of curvature R1 (S100) and providing the backlight unit BLU having the second radius of curvature R2 under the display panel 100 (S200). The providing of the backlight unit BLU (S200) includes providing of the light sources 210 and the scattering units 220.

First, the display panel 100 having the first radius of curvature R1 is prepared (S100). The display panel 100 displays an image. The display panel 100 includes the display surface 101 displaying the image and the rear surface 103 facing the display surface 101. The display panel 100 has the first radius of curvature R1. For instance, the curved display surface 101 of the display panel 100 has the first radius of curvature R1. However, in the case that the display panel 100 is concave-curved when viewed from the curved display surface 101 to the rear surface 103, the rear surface 103 has the first radius of curvature R1.

The backlight unit BLU having the second radius of curvature R2 is provided under the display panel 100 (S200). The providing of the backlight unit BLU includes providing of the light sources 210 and the scattering units 220.

The providing of the light sources 210 and the scattering units 220 includes providing of the light sources 210 in the matrix form along the first direction DR1 and the second direction DR2 substantially perpendicular to the first direction DR1 when viewed in the thickness direction DR4 and providing of the scattering units 220 between the light sources 210.

The providing of the light sources 210 and the scattering units 220 includes providing of the light sources 210 in the matrix form along the first direction DR1 and the third direction DR3 when viewed in the thickness direction DR4 and providing of the scattering units 220 between the light sources 210. The third direction DR3 crosses each of the first direction DR1 and the second direction DR2 substantially perpendicular to the first direction DR1.

The providing of the backlight unit BLU (S200) further includes providing of a reflection sheet 230 under the light sources 210 and the scattering units 220 and providing of the diffusion plate 240 on the light sources 210 and the scattering units 220.

The reflection sheet 230 is disposed under the light sources 210 and the scattering units 220. The reflection sheet 230 reflects at least a portion of the light provided from the light sources 210.

The diffusion plate 240 is disposed on the light sources 210 and the scattering units 220. The diffusion plate 240 diffuses the light provided from the light sources 210. The diffusion plate 240 may include a diffusion agent therein. The diffusion plate 240 may include the diffusion layer coated on the surface thereof.

The vertical distance H1 between the diffusion plate 240 and the reflection sheet 230 and the distance D1 of arc between the light sources 210 arranged in the first direction DR1 satisfy the following relational formula 1. The following relational formula 1 shows the distance D1 of arc between the light sources 210 arranged in the first direction DR1 as a representative example, but the distance D2 between the light sources 210 arranged in the second direction DR2 and the vertical distance between the diffusion plate 240 and the reflection sheet 230 may satisfy the following relational formula 1.

$$6.5 \leq H1/D1 \leq 9.0 \qquad \text{Relational formula 1}$$

When the value of H1/D1 is less than about 6.5, the distance D1 of arc between the light sources 210 arranged in the first direction DR1 is longer than the vertical distance between the diffusion plate 240 and the reflection sheet 230 and the number of the light sources respectively corresponding to the pixels (not shown) of the display panel 100 is reduced. As a result, the dark area of the display panel 100 increases. When the value of H1/D1 exceeds about 9.0, the distance D1 of arc between the light sources 210 arranged in the first direction DR1 is shorter than the vertical distance between the diffusion plate 240 and the reflection sheet 230, and thus the light efficiency of the display panel 100 is lowered compared to the number of the light sources 210.

The distance D1 of arc between the light sources 210 arranged in the first direction DR1 and the first radius of curvature R1 satisfy the following relational formula 2. The following relational formula 2 shows the distance D1 of arc between the light sources 210 arranged in the first direction DR1 as a representative example, but the distance D2 between the light sources 210 arranged in the second direction DR2 and the first radius of curvature R1 may satisfy the following relational formula 2.

$$1/50 \leq D1/R1 \leq 3/50 \qquad \text{Relational formula 2}$$

When the value of D1/R1 is less than about 1/50, the distance D1 of arc between the light sources 210 arranged in the first direction DR1 is shorter than the first radius of curvature R1, and thus the light efficiency of the display panel 100 is lowered compared to the number of the light sources 210. When the value of D1/R1 exceeds about 3/50, the distance D1 of arc between the light sources 210 arranged in the first direction DR1 is longer than the first radius of curvature R1 and the number of the light sources respectively corresponding to the pixels (not shown) of the display panel 100 is reduced. As a result, the dark area of the display panel 100 increases.

As described above, the display device manufactured by the manufacturing method according to the present exemplary embodiment includes the scattering units disposed between the light sources, and thus the amount of the light provided to the display panel is maintained even though the number of the light sources is reduced. In addition, since the light sources are arranged in consideration of relational formulas 1 and 2, the dark area generated when the light sources and the scattering units are provided to the backlight unit having the second radius of curvature may be reduced. Therefore, the number of the light sources of the display device may be reduced and the display quality of the display device may be prevented from being deteriorated.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
   a display panel having a first radius of curvature, responding to light by displaying variable visual images; and
   a backlight unit disposed providing the light to the display panel, the backlight unit having a second radius of curvature,
   the backlight unit comprises:
      a plurality of light sources emitting the light; and
      a plurality of scattering units scattering at least a portion of the light,
   wherein:
   a distance of arc between the light sources arranged in a first direction being in a range from about 80 mm to about 120 mm; and
   the distance (D1) of arc between the light sources arranged in the first direction and the first radius of curvature (R1) satisfying a relational formula of $1/50 \leq D1/R1 \leq 3/50$.

2. The display device of claim 1, the scattering units being sandwiched between the light sources arranged in a matrix form along a first direction and a second direction substantially perpendicular to the first direction when viewed in a thickness direction of the display panel.

3. The display device of claim 2, when viewed in the thickness direction of the display panel, the light sources comprised of:
   a first light source;
   a second light source spaced apart from the first light source in the first direction;
   a third light source spaced apart from the first light source in the second direction; and
   a fourth light source spaced apart from the third light source in the first direction,
   at least one scattering unit of the scattering units being sandwiched between the first, second, third, and fourth light sources.

4. The display device of claim 1, the light sources being arranged in a matrix form along a first direction and a third direction when viewed in a thickness direction of the display panel,
   the third direction crosses each of the first direction and a second direction which is substantially perpendicular to the first direction, and
   the scattering units being sandwiched between the light sources.

5. The display device of claim 4, when viewed in a thickness direction of the display panel, the light sources comprising:
a first light source;
a second light source spaced apart from the first light source in the first direction;
a third light source spaced apart from the first light source in the third direction; and
a fourth light source spaced apart from the third light source in the first direction,
at least one scattering unit of the scattering units being sandwiched between the first, second, third, and fourth light sources.

6. The display device of claim 1, when viewed in a thickness direction of the display panel, comprising:
the light sources being disposed to correspond to vertices of a parallelogram, and
the scattering units being disposed inside the parallelogram.

7. The display device of claim 6, comprised of the scattering units overlapping a cross point of diagonal lines of the parallelogram.

8. The display device of claim 1, comprised of each of the scattering units having a thickness greater than a thickness of each of the light sources.

9. The display device of claim 1, comprised of a number of the scattering units being smaller than a number of the light sources.

10. The display device of claim 1, comprised of each of the scattering units comprising at least one of:
at least one metal selected from the group consisting of gold, silver, aluminum, platinum, palladium, cobalt, ruthenium, copper, indium, nickel, and iron;
an alloy of at least one metal selected from the group consisting of gold, silver, aluminum, platinum, palladium, cobalt, ruthenium, copper, indium, nickel, and iron;
$TiO_2$; $SiO_2$; $BaSO_4$; and $CaCO_3$.

11. The display device of claim 1, comprised of each of the scattering units comprising at least one of polycarbonate (PC), polyethyleneterephthalate (PET), polyethylene (PE), polypropylene (PP), polysulfone (PSF), polymethylmethacrylate (PMMA), triacetylcellulose (TAC), cycloolefin (COP), and cycloolefin copolymer (COC).

12. The display device of claim 1, the backlight unit further comprising:
a reflection sheet disposed under the light sources and the scattering units to reflect at least a portion of the light; and
a diffusion plate disposed on the light sources and the scattering units to diffuse the light, wherein a vertical distance (H1) between the diffusion plate and the reflection sheet and the distance (D1) of arc between the light sources arranged in the first direction satisfy a relational formula of $6.5 \leq H1/D1 \leq 9.0$.

13. The display device of claim 2, when viewed in a thickness direction of the display panel, comprised of the scattering units being symmetrically disposed with respect to the light sources.

14. The display device of claim 2, when viewed in a thickness direction of the display panel, comprised of the scattering units being non-symmetrically disposed with respect to the light sources.

15. A method of manufacturing a display device, comprising:
preparing a display panel having a first radius of curvature; and
providing a backlight unit having a second radius of curvature under the display panel,
the providing the backlight unit comprised of providing a plurality of light sources and a plurality of scattering units,
wherein:
a distance of arc between the light sources arranged in a first direction being in a range from about 80 mm to about 120 mm; and
the distance (D1) of arc between the light sources arranged in the first direction and the first radius of curvature (R1) satisfying a relational formula of $1/50 \leq D1/R1 \leq 3/50$.

16. The method of claim 15, the provision of the light sources and the scattering units comprising:
providing the light sources in a matrix form along a first direction and along a second direction substantially perpendicular to the first direction when viewed in a thickness direction of the display panel; and
providing the scattering units sandwiched between the light sources.

17. The method of claim 15, the provision of the light sources and the scattering units comprising:
providing the light sources in a matrix form along a first direction and along a third direction when viewed in a thickness direction of the display panel; and
providing the scattering units sandwiched between the light sources,
the third direction crossing each of the first direction and a second direction, the second direction being substantially perpendicular to the first direction.

18. The method of claim 15, the provision of the backlight unit further comprising:
providing a reflection sheet under the light sources and the scattering units; and
providing a diffusion plate on the light sources and on the scattering units, wherein a vertical distance (H1) between the diffusion plate and the reflection sheet and the distance (D1) of arc between the light sources arranged in the first direction satisfies a relational formula of $6.5 \leq H1/D1 \leq 9.0$.

19. A display device comprising:
a display panel having a first radius of curvature, responding to light by displaying variable visual images; and
a backlight unit disposed under the display panel to provide the light to the display panel, the backlight unit having a second radius of curvature, the backlight unit comprising:
a plurality of light sources emitting the light; and
a plurality of scattering units having curved bottoms, scattering at least a portion of the light,
wherein:
a distance of arc between the light sources arranged in a first direction being in a range from about 80 mm to about 120 mm; and
the distance (D1) of arc between the light sources arranged in the first direction and the first radius of curvature (R1) satisfying a relational formula of $1/50 \leq D1/R1 \leq 3/50$.

20. A display device comprising:
a display panel having a first radius of curvature, responding to light by displaying variable visual images; and
a backlight unit disposed under the display panel to provide the light to the display panel, the backlight unit having a second radius of curvature, and the backlight unit comprising:
a plurality of light sources emitting the light; and a plurality of scattering units arranged along the second radius of curvature, scattering at least a portion of the light, wherein:

a distance of arc between the light sources arranged in a first direction being in a range from about 80 mm to about 120 mm; and the distance (D1) of arc between the light sources arranged in the first direction and the first radius of curvature (R1) satisfying a relational formula of $1/50 \leq D1/R1 \leq 3/50$.

* * * * *